Sept. 9, 1969          H. B. MACLAY          3,465,725
STOCK FEED LOADER FOR FEEDING BUNKS
Filed Oct. 13, 1967          4 Sheets-Sheet 1
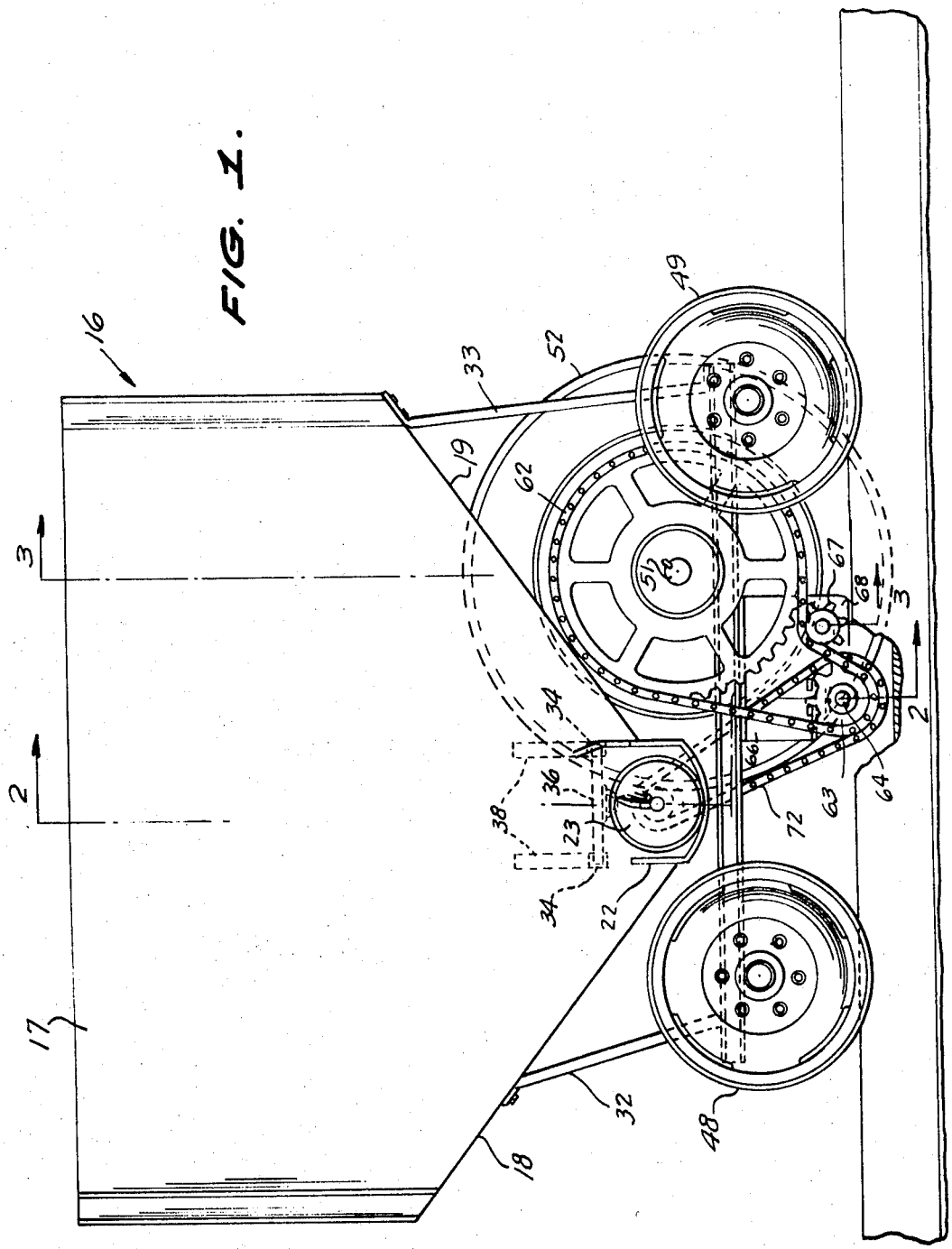
INVENTOR.
HOLMES B. MACLAY,
BY
Berman, Davidson & Berman
ATTORNEYS.

Sept. 9, 1969
H. B. MACLAY
3,465,725
STOCK FEED LOADER FOR FEEDING BUNKS
Filed Oct. 13, 1967
4 Sheets-Sheet 2
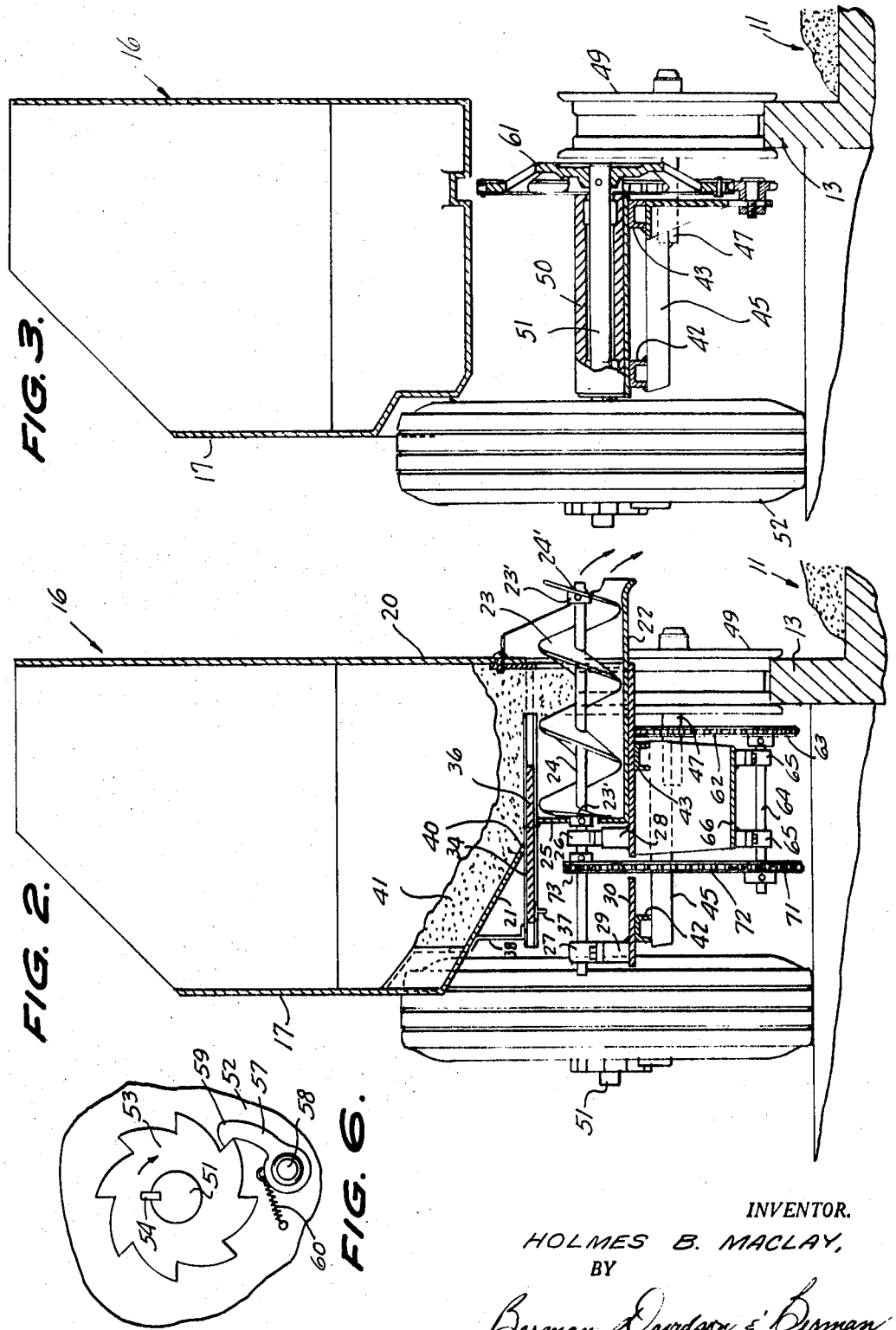
INVENTOR.
HOLMES B. MACLAY,
BY
Berman, Davidson & Berman
ATTORNEYS.

Sept. 9, 1969            H. B. MACLAY            3,465,725

STOCK FEED LOADER FOR FEEDING BUNKS

Filed Oct. 13, 1967                           4 Sheets-Sheet 3

INVENTOR.
HOLMES B. MACLAY,
BY
*Berman, Damden & Berman*
ATTORNEYS.

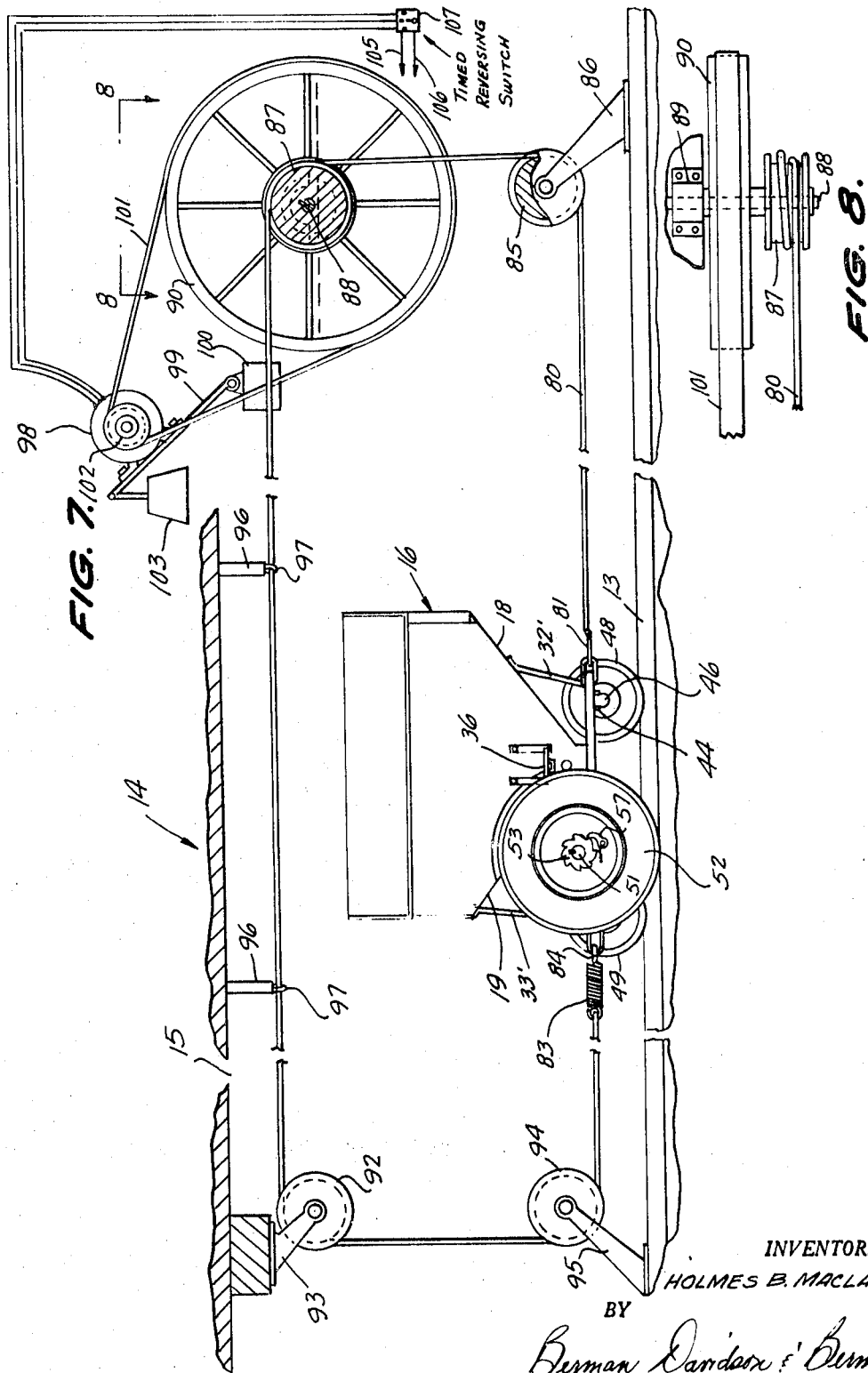

United States Patent Office 3,465,725
Patented Sept. 9, 1969

3,465,725
STOCK FEED LOADER FOR FEEDING BUNKS
Holmes B. Maclay, Florence, Mont. 59833
Filed Oct. 13, 1967, Ser. No. 675,181
Int. Cl. A01k 5/00
U.S. Cl. 119—52                                10 Claims

ABSTRACT OF THE DISCLOSURE

A system for delivering feed from a stationary central bin through a wheeled hopper to a feed bunk. The wheeled hopper has a delivery auger moving the feed through a discharge chute at the bottom of the hopper overlying the feed bunk. The auger is guided by flanged wheels on the hopper engaging a rail extending along and forming the outer wall of the feed bunk. One hopper-supporting wheel is drivingly coupled to the auger by sprocket chains. The wheeled hopper is moved along the rail by a rope having its ends connected to opposite ends of the hopper and passing over pulleys, one of which is driven by a reversible electric motor. The loaded wheeled hopper is moved along the rail and is discharged, after which the motor is reversed and the hopper is returned to the central bin for reloading. The feed auger is driven through a pawl and ratchet which allows the hopper to return to the loading position without rotating the auger. The ratchet can be set, at times, in a position disengaged from the pawl to allow forward movement of the hopper without feeding action. The motor can be energized through a timed reversing switch.

---

This invention relates to material-distributing devices, and more particularly to a system for delivering feed from a stationary bin to a feed bunk.

A main object of the invention is to provide a novel and improved material-distributing system, which may be employed for delivering feed from a stationary central supply bin to a feed bunk extending along a row of animal stalls, or which may be employed for distributing any other type of material of a fluent nature, the device involving relatively simple components, being reliable in operation, being relatively compact in size, and which eliminates the necessity of providing a feed auger extending the full length of the feed bunk as has been required in systems employed up to the present.

A further object of the invention is to provide an improved delivery system for distributing feed from a central supply bin to a feed bunk extending along a row of animal stalls, the improved system including relatively inexpensive components, being durable in construction, being reliable in operation, and being adapted for automatic performance.

A still further object of the invention is to provide an improved delivery system for distributing feed to animals located in stalls arranged along a feed bunk, or for delivering fluent material to a trough or other elongated receptacle, the improved delivery device being readily adjustable to deliver material at a desired rate, operating with a minimum amount of human supervision, and being easy to maintain in proper working order.

Further objects and advantages of the invention will become apparent from the following description and claims, and from the accompanying drawings, wherein:

FIGURE 1 is a side elevation view, with a portion thereof broken away, showing part of an improved material-delivery system according to the present invention, namely, a wheeled hopper and a portion of the guide rail cooperating with the hopper.

FIGURE 2 is a transverse vertical cross-sectional view taken substantially on the line 2—2 of FIGURE 1.

FIGURE 3 is a transverse vertical cross-sectional view taken substantially on the line 3—3 of FIGURE 1.

FIGURE 6 is an elevational view taken substantially on the line 6—6 of FIGURE 5.

FIGURE 7 is a fragmentary side elevational view, partly in vertical cross-section, showing the feed-delivery system associated with the structures of FIGURES 1 to 6, and showing the electrical connections of the driving motor associated with the system.

FIGURE 8 is a fragmentary top plan view taken substantially on the line 8—8 of FIGURE 7.

Figure 5:
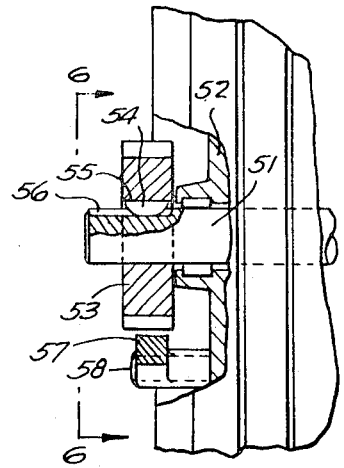
FIGURE 5 is an enlarged fragmentary vertical cross-sectional view showing the pawl and ratchet coupling between the ground-engaging wheel and the auger drive mechanism of the wheeled hopper employed in the system of FIGURE 1.

Referring to the drawings, 11 designates a feed bunk located adjacent a row of animal stalls 12, and 13 designates the outer wall of the feed bunk, said wall running for the length of the feed bunk and being substantially vertical, as shown in FIGURES 2 and 3. A feed bin 14 is located above the feed bunk 11 and has a discharge opening 15 above and adjacent one end portion of the feed bunk, as shown in FIGURE 7.

The feed bin does not necessarily have to be located above the feed bunk. If so desired, it may be located at the same level as the feed bunk, and a feed auger mechanism may be provided to supply the feed to the point of discharge at 15.

Designated generally at 16 is a wheeled hopper comprising a hopper receptacle 17 which is open at its top end and which has downwardly-convergent bottom walls. Thus, the bottom portion of the receptacle 17 has the downwardly-convergent forward and rear wall portions 18 and 19, the vertical inner wall 20 and the downwardly and inwardly-inclined outer bottom wall portion 21, as shown in FIGURE 2. The bottom of the hopper 16 is provided with the transversely-extending discharge chute 22 projecting laterally beyond the vertical inner wall portion 20, as shown in FIGURE 2, and terminating over the feed bunk 11. The discharge chute 22 contains a feed auger 23 mounted on the transverse shaft 24 which extends through the outer end walls 25 of the dishcarge chute 22 and which is journaled in suitable bearing assemblies 26 and 27 mounted on respective upstanding blocks 28 and 29 which are, in turn, secured on a horizontal supporting plate 30 rigidly-secured to the frame of the hopper underneath the discharge chute 22.

The hopper receptacle 17 may be suitably braced by the provision of strut bars 32 and 33 connecting the undersides of the forward and rear portions of the hopper receptacle to subjacent portions of the hopper frame, as shown in FIGURE 1. Thus, strut bars 32 and 33 are provided at one side of the hopper and corresponding strut bars 32' and 33' are provided on the opposite side thereof.

A pair of transversely-extending opposing channel bars 34, 34 extend through an aperture 40 provided in the lower portion of the inclined outer bottom wall member 21 adjacent the inner end of the auger 23, defining supporting guides for the opposite side edges of a slidable plate member 36 which may be thus supported for adjustment to control the rate of flow of material from the hopper receptacle 17 into the chute 22. The plate member 36 is provided at its outer end portion with a depending handle 37 for manually-adjusting the position of the plate member. The plate member 36 is of sufficient length so that it can, if so desired, be adjusted inwardly to a position such as to substantially completely cut off the flow of feed material 41, or other material contained in the hopper receptacle. The outer end portions of the channel bars 34 are supported from the inclined wall element 21 by means of suitable connecting brackets 38. As shown in FIGURE 2, the sliding gate element 36 is located in a horizontal plane immediately above the auger 23 and can be manually-adjusted to provide a desired rate of gravitation of the material 41 into the chute 22.

The frame of hopper 16 includes a pair of longitudinally-extending, downwardly-facing channel bars 42, 43. Rigidly-secured to the frame bars 42, 43 are respective longitudinally-spaced transversely-extending crossbars 44, 45, comprising downwardly-facing channel bars, in which are welded respective axles 46 and 47. Suitably-journaled on the axles 46 and 47 are respective flanged wheels 48 and 49, which may comprise conventional drop-center automotive vehicle wheels, as shown. The flanged wheels 48 and 49 are adapted to closely receive the top edge of the upstanding rail-like outer wall 13 of the feed bunk 11, as is clearly shown in FIGURES 2 and 3. As shown in FIGURE 1, the wheels 49 and 48, respectively, underlie the inclined rear and front bottom wall portions 19 and 18 of the hopper receptacle 17.

Rigidly-secured on plate member 30, and thus rigidly-secured to the frame of the hopper is a transversely-extending sleeve 50 in which is journaled an axle 51. The axle 51 extends outwardly beneath the hopper receptacle 17, and a conventional rubber-tired ground-engaging wheel 52 is journaled thereon in the manner illustrated in FIGURE 5. Thus, a ratchet wheel 53 is splined or keyed to the axle 51 by means of a key element 54 engaging between a keyway 55 in the ratchet wheel 53 and a relatively long keyway 56 provided in axle 51. A pawl member 57 is pivoted at 58 to the wheel 52 with the dog portion 59 of the pawl biased into engagement with the periphery of ratchet wheel 53 by a coiled spring 60 connecting the pawl member 57 to the wheel 52. Thus, as viewed in FIGURE 6, the wheel 52 may freely rotate in a counterclockwise direction relative to the axle 51, but rotation of the wheel 52 in a clockwise direction is transmitted to the axle 51 through the pawl member 57 and the ratchet wheel 53.

Since the keyway 56 is of substantial length, the ratchet wheel 53 may, at times, be moved outwardly from the position thereof shown in FIGURE 5 to a position wherein the pawl member 57 cannot engage the ratchet wheel, thus uncoupling axle 51 from wheel 52.

Figure 4:
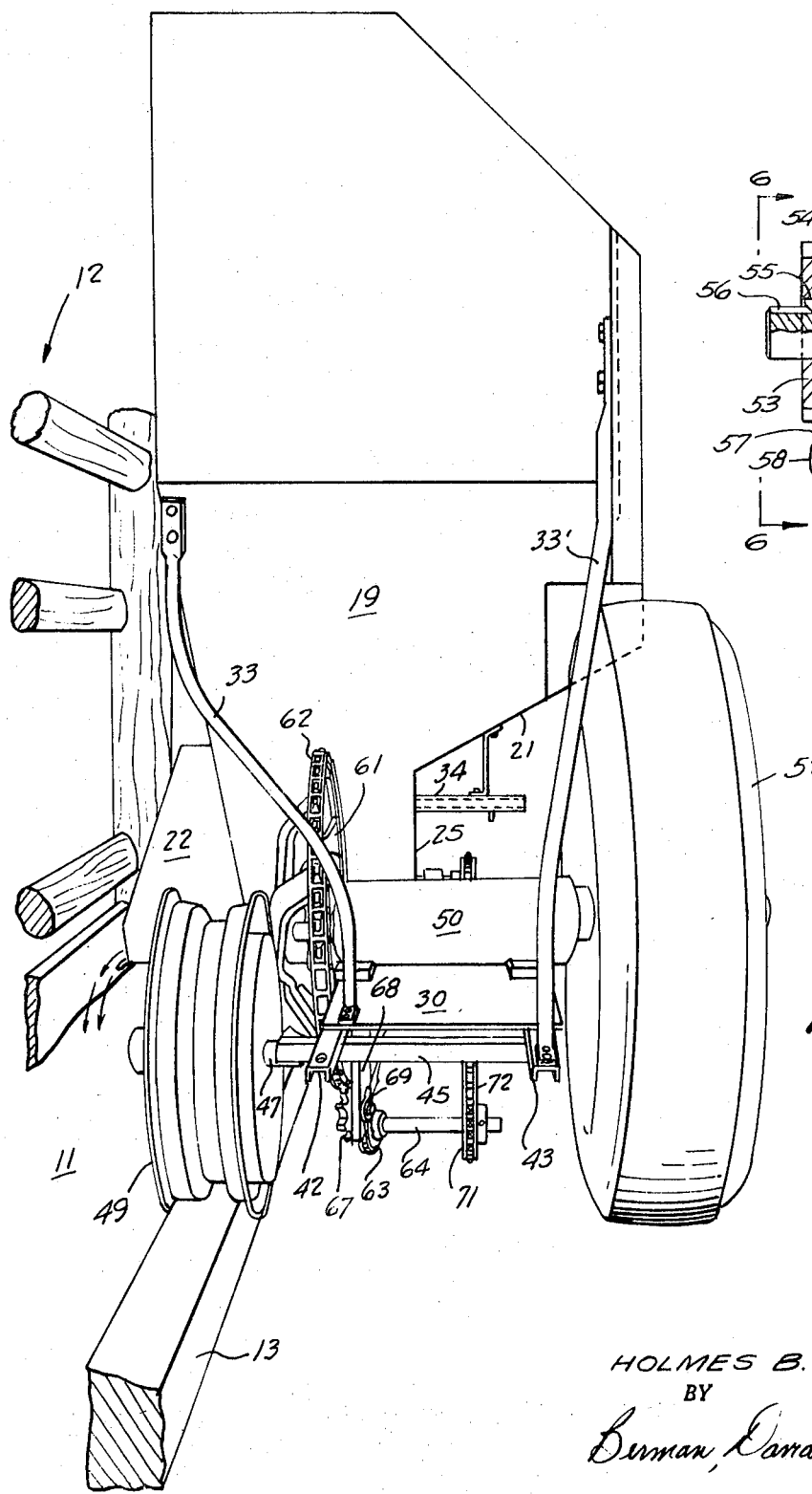
FIGURE 4 is a perspective view, to a somewhat enlarged scale, of the wheeled hopper and a portion of the guide rail of FIGURE 1 as seen substantially from the right end of FIGURE 1.

Secured on the inner end of axle 51 is a relatively large sprocket wheel 61 which is drivingly-coupled by means of a sprocket chain 62 to a relatively smaller sprocket wheel 63 secured on a transverse countershaft 64 journaled in bearings 65, 65 depending from a U-shaped bracket plate 66 rigidly-secured to and forming part of the hopper frame. As shown in FIGURES 1 and 4, the sprocket chain 62 passes over a tightness-adjusting sprocket 67 adjustably-mounted on a depending arm 68, the shaft of the idler sprocket 67 being adjustable in a slot 69 provided in arm 68. The arm 68 may be formed integrally on the generally U-shaped supporting bracket 66.

Secured on the outer end of the countershaft 64 is a sprocket wheel 71 which is drivingly-coupled by a sprocket chain 72 to a sprocket wheel 73 secured on the auger shaft 24. Thus, with the pawl and ratchet structure of FIGURES 5 and 6 in normal operative relationship, as illustrated, forward movement of the hopper 16, namely, movement of the hopper 16 to the right, as viewed in FIGURE 7, causes the load-supporting wheel 52 to rotate in a clockwise direction, as viewed in FIGURE 7, whereby the ratchet wheel 53 is also rotated clockwise along with the shaft 51. This rotates the auger shaft 24 due to the sprocket chain coupling system above-described, and causes the auger 23 to move the material 41 outwardly, namely, to the right, as viewed in FIGURE 2, so as to be discharged through the chute 22 into the feed bunk 11.

The hopper assembly 16 is moved along the rail 13 by a rope 80 having one end thereof connected at 81 to the forward end of the longitudinal channel-shaped frame bar 42 and the opposite end connected through a coiled spring 83 to the rear end of said longitudinal frame bar 42, as shown at 84. The rope 80 passes around a first lower guide pulley 85 journaled in a stationary bracket 86 located adjacent the forward end of the feed bunk 11, the rope passing upwardly from the pulley 85 and being wound around a driving pulley 87 mounted on an elevated transverse shaft 88 journaled in a suitable stationary bearing 89 located above the location of bracket 86 and being provided with a large pulley 90, as shown in FIGURE 8. The rope 80 is wound approximately one and one-quarter turns around the drive pulley 87 and is supported adjacent the opposite end of the feed bunk on a pulley 92 journaled in a stationary bracket 93. The rope passes downwardly from pulley 92 and around a rear bottom pulley 94 supported in a stationary bracket 95. The top run of the rope 80 is slidably-supported in a plurality of depending bracket members 96 having bottom eye portions 97 through which the cable extends.

As shown in FIGURE 7, the rear upper supporting pulley 92 is located rearwardly of the discharge opening 15 and is spaced sufficiently therefrom to allow the hopper receptacle 17 to be brought beneath the discharge opening 15 for filling the receptacle with the feed or other material to be distributed.

A reversible electric motor 98 is mounted on a pivoted plate member 99 which is pivotally-supported on a stationary bracket block 100 located adjacent to the large drive pulley 90, as shown in FIGURE 7. A transmission belt 101 couples the output pulley 102 of motor 98 to the drive pulley 90. A biasing weight 103 is connected to the free end portion of supporting plate 99, as shown, biasing plate 99 in a counterclockwise direction, as viewed in FIGURE 7, and exerting suitable tension on the transmission belt 101.

The motor 98 may be energized from a suitable power supply source through any suitable type of control switch. For example, the motor 98 may be connected to the supply wires, shown at 105, 106 through a conventional timed reversing switch 107. Thus, assuming the hopper assembly 16 to be first positioned beneath the discharge opening 15 so that it is filled with feed or similar material to be distributed, the switch 107 may be manually-operated to energize the motor 98 to cause the motor to drive pulley 90 in a counterclockwise direction for a timed period, namely, for a period sufficient to move the hopper assembly 16 to the right, as viewed in FIGURE 7, substantially for the full length of its travel along the rail 13, after which the switch automatically releases and returns to a position energizing the motor 98 in a reverse direction, thereby returning the hopper assembly 16 to its filling position beneath the aperture 15. The timed switch 107 may be of a type which automatically causes the motor 98 to become de-energized after it has returned to its loading position beneath aperture 15. As above-mentioned, the switch 107 is of a conventional type, and forms no part of the present invention. Also, the reversing switch 107 may be of a type which is manually-operated.

As above-described, when the hopper assembly 16 is moved rightward, as viewed in FIGURE 7, the auger 23 is rotated to cause material to be distributed into the feed bunk 11 from the chute 22. When the hopper assembly is returned leftward, the load-supporting wheel 52 may rotate freely in a direction such that pawl 59 slips over the teeth of the ratchet wheel 53, namely, in a counterclockwise direction, as viewed in FIGURES 6 and 7, whereby the auger 23 remains stationary while the hopper assembly 16 is returned to its loading position.

The apparatus may be readily modified to deliver feed in a direction opposite to that above-described. This modification requires the following three steps:

(1) Ratchet wheel 53 must be reversed on its shaft, pawl 57 must be reversed on its pivot, and pawl spring 60 must be relocated to provide the necessary tension on pawl 57.

(2) Idler sprocket 67 must be relocated so as to engage the left run of sprocket chain 62, as viewed in FIGURE 1, so that the chain will remain properly tight for reverse rotation.

(3) An auger of opposite pitch must be substituted for the auger 23 so that it will deliver material outwardly with reversed rotation. To facilitate such substitution, the augers are each provided at their opposite ends with collars 23', 23' welded thereto and provided with set screws 24' for clampingly-securing the auger to shaft 24 received in the collars.

It will be readily apparent that the apparatus above-described is particularly adapted for completely automatic operation, particularly if a timed switch 107 is employed having a built-in programming means providing the desired operating cycles responsive to actuation of a pushbutton or lever. As above-mentioned, such programming switch devices are well-known in the art.

The apparatus above-described is particularly adapted for use in distributing feed to a feed bunk, as pointed out above in detail, but is also applicable for use in distributing other material which can be augered. The apparatus described above affords numerous additional important advantages, for example, it does not require an expensive overhead track and can be readily installed either inside or outside a building. Furthermore, it can be used in a building with relatively low head room. The track member 13, forming the outer wall of the feed bunk can be made of any suitable material, such as wood, concrete, or the like. The floor surface outside of the feed bunker is preferably of suitable material providing substantial frictional engagement by the main load-supporting wheel 52, and is preferably of concrete or wooden planks. The supporting surface for the wheel 52 is, of course, of a length corresponding to the length of the feed bunk 11, and the rope 80 and its supporting system are also of a length to permit the distributing cart assembly 16 to move along the required length of feed bunks. The capacity of the hopper receptacle 17 can be modified, as required, for example, by increasing the height of its walls. The apparatus is particularly advantageous in distributing feed for beef cattle, but it can be employed with equal advantages to feed dairy cattle, hogs, poultry, or the like. It can be employed to distribute any material sufficiently fluent to be moved by the auger device 23.

It will be noted that the main driving motor 98 is in a substantially fixed location and, therefore, does not require flexible supply wires of substantial lengths for energizing same. The supply wires need only be sufficiently flexible to allow for a limited amount of pivoting movement of the supporting plate 99 required for maintaining proper tension in the drive belt 101.

If a completely manually-operated reversing switch 107 is employed, material can be distributed along any desired length of the feed bunk 11, after which the hopper assembly 16 may be returned to its starting position for refilling by reversing the control switch 107.

While a specific embodiment of an improved material feeding apparatus has been disclosed in the foregoing description, it will be understood that various modifications within the spirit of the invention may occur to those skilled in the art. Therefore, it is intended that no limitations be placed on the invention.

What is claimed is:

1. A material-feeding apparatus comprising an elongated feed bunk having an upstanding elongated outer wall, a wheeled feed hopper having a plurality of spaced peripherally-channeled supporting wheels on one side thereof supportingly-engaged on and receiving the top edge of said outer wall and having a ground-engaging supporting wheel located outboard of said trough wall and on the opposite side of said hopper, a means on said hopper for moving the hopper, a laterally-extending discharge chute communicatively-connected to the bottom of the hopper and terminating over the feed bunk, a rotary distributing auger operatively-mounted in said discharge chute for moving material outwardly through the chute responsive to rotation of the auger, and means drivingly-coupling said ground-engaging wheel to said auger for rotating the auger responsive to movement of the wheel hopper along said upstanding outer wall.

2. The material-feeding apparatus of claim 1, and a transversely-movable control plate slidably-mounted in the bottom of the hopper overlying said discharge chute for controlling the rate of flow of material from the hopper into the discharge chute.

3. The material-feeding apparatus of claim 2, and wherein said coupling means includes pawl and ratchet means between the ground-engaging wheel and the auger transmitting torque from the wheel to the auger in only one direction of rotation of the wheel.

4. The material-feeding apparatus of claim 2, and wherein said hopper is provided with a transverse axle journaled therein, said ground-engaging wheel being journaled on said axle, said coupling means comprising sprocket chain means drivingly-connecting said axle to said auger, and pawl and ratchet means on the ground-engaging wheel and axle drivingly-coupling the ground-engaging wheel to the axle for only one direction of rotation of the ground-engaging wheel.

5. The material-feeding apparatus of claim 4, and wherein said pawl and ratchet means comprises a pawl pivoted to the wheel and a ratchet wheel secured to the axle and engaged by said pawl.

6. The material-feeding apparatus of claim 5, and said hopper moving means comprising a plurality of rope-supporting pulleys mounted in fixed positions and spaced along said feed bunk, and a tow rope engaged over said supporting pulleys and connected to opposite ends of the wheeled hopper.

7. The material-feeding apparatus of claim 6, and a reversible drive motor, and means operatively-coupling said drive motor to one of said supporting pulleys.

8. The material-feeding apparatus of claim 7, and wherein the supporting pulleys include respective pairs of vertically-spaced pulleys located adjacent the opposite ends of the feed bunk, the drive motor being coupled to the upper pulley of one of said pairs.

9. The material-feeding apparatus of claim 8, and wherein said control plate extends outwardly of the hopper at the side thereof adjacent the ground-engaging wheel.

10. The material-feeding apparatus of claim 4, and wherein said hopper is provided at its bottom with a transverse bearing sleeve, said axle being journaled in said bearing sleeve.

References Cited

UNITED STATES PATENTS

| 1,138,950 | 5/1915 | Henderson | 105—241 |
| 2,786,448 | 3/1957 | McMaster | 119—52 |
| 2,797,663 | 7/1957 | Bailey | 119—52 |
| 2,941,505 | 6/1960 | Middlen | 119—51 |
| 3,065,808 | 11/1962 | Dodgen | 119—52 X |

FOREIGN PATENTS

| 325,006 | 12/1902 | France. |
| 1,048,065 | 12/1958 | Germany. |

ALDRICH F. MEDBERY, Primary Examiner